(12) United States Patent
Wang et al.

(10) Patent No.: US 12,189,202 B2
(45) Date of Patent: Jan. 7, 2025

(54) SPLIT LENS ASSEMBLY AND CAMERA MODULE

(71) Applicant: NINGBO SUNNY OPOTECH CO., LTD., Ningbo (CN)

(72) Inventors: Mingzhu Wang, Ningbo (CN); Chunmei Liu, Ningbo (CN); Shoujie Wang, Ningbo (CN); Nan Guo, Ningbo (CN); Lifeng Yao, Ningbo (CN); Liang Ding, Ningbo (CN)

(73) Assignee: NINGBO SUNNY OPOTECH CO., LTD. (CN)

( * ) Notice: Subject to any disclaimer, the term of this patent is extended or adjusted under 35 U.S.C. 154(b) by 455 days.

(21) Appl. No.: 16/496,192

(22) PCT Filed: Mar. 23, 2018

(86) PCT No.: PCT/CN2018/080193
§ 371 (c)(1),
(2) Date: Sep. 20, 2019

(87) PCT Pub. No.: WO2018/171714
PCT Pub. Date: Sep. 27, 2018

(65) Prior Publication Data
US 2020/0158980 A1    May 21, 2020

(30) Foreign Application Priority Data

Mar. 24, 2017  (CN) .......................... 201710190450.5
Mar. 24, 2017  (CN) .......................... 201720294950.9

(51) Int. Cl.
*G02B 7/02*   (2021.01)
*G02B 13/00*  (2006.01)

(52) U.S. Cl.
CPC ............. *G02B 7/021* (2013.01); *G02B 7/025* (2013.01); *G02B 13/0045* (2013.01)

(58) Field of Classification Search
CPC ........ G02B 7/021; G02B 7/023; G02B 7/025; G02B 7/022; G02B 7/026; G02B 7/02; G02B 13/001; G02B 13/0015; G02B 1/04
(Continued)

(56) References Cited

U.S. PATENT DOCUMENTS 2,497,147 A * 2/1950 Washam .................. G02B 7/04
                                                     359/829
4,801,196 A * 1/1989 Betensky ................. G02B 9/34
                                                     359/649
(Continued)

FOREIGN PATENT DOCUMENTS

| CN | 1776474 A | 5/2006 |
| CN | 201344989 Y | 11/2009 |

(Continued)

OTHER PUBLICATIONS

International Search Report for PCT/CN2018/080193, dated Jun. 15, 2018, 6 pages.
Chinese Search Report for Application 2017101904505, 1 page.

*Primary Examiner* — Travis S Fissel
(74) *Attorney, Agent, or Firm* — Barnes & Thornburg LLP

(57) ABSTRACT

Disclosed are a split lens assembly and a camera module. The split lens assembly comprises a first lens module and a second lens module. The first lens module is assembled to the second lens module. The first lens module and the second lens module are calibrated and assembled. A spacing that facilitates calibration is located between the first lens module and the second lens module.

15 Claims, 9 Drawing Sheets

(58) Field of Classification Search
USPC ........ 359/819, 821–823, 713–717, 691, 676, 359/660, 646
See application file for complete search history.

(56) References Cited

U.S. PATENT DOCUMENTS

| | | | |
|---|---|---|---|
| 2006/0087751 A1* | 4/2006 | Liu | G02B 7/025 359/819 |
| 2007/0115375 A1* | 5/2007 | Yu | G02B 7/102 348/240.99 |
| 2011/0084220 A1* | 4/2011 | Koning | B82Y 10/00 29/592.1 |
| 2011/0316108 A1* | 12/2011 | Nihei | H01L 27/14683 438/69 |
| 2012/0116632 A1* | 5/2012 | Bechtel | G06V 10/147 701/1 |
| 2012/0162795 A1* | 6/2012 | Yoshimura | G02B 13/001 359/830 |
| 2012/0170125 A1* | 7/2012 | Han | G02B 7/021 359/601 |
| 2012/0218649 A1 | 8/2012 | Konishi et al. | |
| 2013/0063655 A1* | 3/2013 | Hsu | H04N 23/55 156/303.1 |
| 2014/0037616 A1 | 2/2014 | Grosveld | |
| 2014/0340771 A1 | 11/2014 | Wakabayashi et al. | |
| 2014/0376116 A1 | 12/2014 | Yang et al. | |
| 2015/0226931 A1* | 8/2015 | Huang | G02B 7/022 359/716 |
| 2015/0273799 A1* | 10/2015 | Takama | B32B 37/142 428/189 |
| 2016/0139362 A1* | 5/2016 | Kawasaki | G02B 13/16 359/715 |
| 2016/0165125 A1* | 6/2016 | Kim | G03B 3/10 348/345 |
| 2016/0306161 A1* | 10/2016 | Harada | G02B 13/06 |
| 2016/0349504 A1* | 12/2016 | Kim | G02B 27/0018 |
| 2017/0235107 A1* | 8/2017 | Lai | G02B 13/0045 359/714 |
| 2018/0051127 A1* | 2/2018 | Arai | G02B 7/021 |
| 2018/0164531 A1* | 6/2018 | Wei | G02B 7/025 |

FOREIGN PATENT DOCUMENTS

| | | | |
|---|---|---|---|
| CN | 102023361 A | 4/2011 | |
| CN | 202837664 U | 3/2013 | |
| CN | 105445889 A | 3/2016 | |
| CN | 105487190 A | 4/2016 | |
| CN | 105487248 A | 4/2016 | |
| CN | 205594214 U | 9/2016 | |
| CN | 205594216 U | 9/2016 | |
| CN | 205880326 U | 1/2017 | |
| CN | 107238909 A | 10/2017 | |
| CN | 207263999 U | 4/2018 | |
| EP | 2498112 A1 * | 9/2012 | ............ G02B 7/021 |
| JP | 1973056149 A | 5/1973 | |
| JP | 1993045616 U | 7/1993 | |
| JP | 11352432 A | 12/1999 | |
| JP | H11352432 A | 12/1999 | |
| JP | 2007065515 A | 3/2007 | |
| JP | 2007178541 A | 7/2007 | |
| JP | 2009156958 A | 7/2009 | |
| JP | 2009175331 A | 8/2009 | |
| JP | 2009198679 A | 9/2009 | |
| JP | 2010191345 A | 9/2010 | |
| JP | 2010243566 A | 10/2010 | |
| JP | 2012083439 A | 4/2012 | |
| JP | 05045616 B2 | 10/2012 | |
| JP | 2012226202 A | 11/2012 | |
| JP | WO2012098808 A1 | 6/2014 | |
| JP | 2015018178 A | 1/2015 | |
| JP | 2018537725 A | 12/2018 | |
| KR | 20140076761 A | 6/2014 | |
| KR | 20150120735 A | 10/2015 | |
| WO | 2014203677 A1 | 12/2014 | |

\* cited by examiner

SPLIT LENS ASSEMBLY AND CAMERA MODULE

CROSS-REFERENCE TO RELATED APPLICATION

This application claims the priorities of Chinese Patent Application No. 201710190450.5, filed on Mar. 24, 2017, and Chinese Patent Application No. 201720294950.9, filed on Mar. 24, 2017, the contents of which are incorporated herein by reference in its entirety.

TECHNICAL FIELD

The present disclosure relates to a split lens assembly and a camera module, and particularly to a lens assembly applicable to a camera module in a smart mobile device.

BACKGROUND

The quality of the lens assembly is a key factor that directly influences the camera performance. A high-quality lens assembly is of great importance to the production of high-quality products in the video camera industry. In the camera and video camera area, research on various aspects of the lens assembly can reflect a manufacturer's pursuit of high quality and high performance. The popularity of smart mobile devices provides a broad market for optical lenses and also poses many challenges for the design, research and development of optical lenses in the smart mobile devices.

Smart mobile devices, especially mobile phones, tablet computers, portable computers, smart service terminals, or even portable identification devices, are popular products on the market. Camera modules have been directly assembled in the device as a vital sensor device. For many devices, the requirements on the camera modules are no less than those on the professional camera equipment. Higher requirements are also imposed on the lens assembly in the camera module.

Clearly, the most effective method is to improve the lens assembly in the camera module, because the key component affecting the resolution of the camera module is the lens assembly. A conventional lens assembly is obtained by mounting several lenses into a black lens barrel, and fixing the lenses in the lens barrel. For conventional lens assemblies, for example, large aperture lens assemblies, due to the machining tolerance of the lens and the lens barrel, in the case of a high sensitivity optical system and a given resolution specification, conventional production methods may cause a great loss in yield, resulting in high production costs and low output.

Particularly, in conventional lens assemblies and camera modules, all lenses are in contact with and press against each other. The edges of the lenses are fixed in a stacked fashion. Conventionally, a spacer ring is generally used to block non-light-transmissive portions of lenses, as a result, the lenses are placed in contact with and pressing against the spacer ring. Furthermore, to ensure the quality of the lens assembly, the single component tolerance and assembly precision need to be strictly controlled, and the lenses need to be rotated for particular eccentric compensation during the assembly process.

How to improve the performance of the lens assembly in the camera module while increasing the yield and the production efficiency as well as reducing the cost is an important research topic for the production of camera modules.

SUMMARY

The present disclosure provides a split lens assembly and a camera module, which use a combination of two lens modules, to improve the performance of the lens assembly while reducing the design costs, assembly difficulty and production costs.

The present disclosure provides a split lens assembly and a camera module, which, by simplifying the structure of the lens module and by means of automatic calibration, make the split lens assembly to have higher performance when applied to the camera module.

The present disclosure provides a split lens assembly and a camera module, which, by simplifying the design and mounting of at least one lens in the lens module, make the entire split lens assembly have good integrity and consistency, thereby facilitating the image quality calibration.

The present disclosure provides a split lens assembly and a camera module, where the relative positions of lens sets of different lens modules are adjusted by adjusting the relative positions of the lens modules, to compensate for losses such as peaks, field curvature, and an image plane inclination caused by lenses and assembly tolerances, thereby improving the overall image quality of the entire camera module.

The present disclosure provides a split lens assembly and a camera module, the lens module further comprises a lens barrel. The lens barrel has a mounting portion suitable for different connection manners, so that two lens modules can be assembled together stably and reliably.

The present disclosure provides a split lens assembly and a camera module, where the mounting portions are reliably connected by means of a connecting medium, thereby ensuring the final firm state of the lens assembly or the camera module.

The present disclosure provides a split lens assembly and a camera module, where the mounting portion is suitable for multiple connection manners. For different lens assemblies, the connection manner of the mounting portion is adaptive.

The present disclosure provides a split lens assembly and a camera module, the split lens assembly further comprises at least one spacer, and the spacer is disposed between the lenses for mechanical restriction or light blocking, so as to ensure the quality of the lens module.

The present disclosure provides a split lens assembly and a camera module, where the spacer is flexibly designed to ensure reasonableness and meet the requirements of the lens module, so as to ensure the quality of the camera module.

The present disclosure provides a split lens assembly and a camera module, where a certain spacing is located between a lens set of one lens module and a lens set of another lens module, and the lens sets are not in contact with or press against each other by means of the spacer.

The present disclosure provides a split lens assembly and a camera module. For the requirements of different lenses on the image quality, the cooperation between the spacer and the mounting portion makes the optical relationship between two lens modules stable and reliable.

The present disclosure provides a split lens assembly and a camera module, where the lenses are closely arranged in an orderly manner by means of the spacer, thereby improving the integrity of the split lens assembly.

The present disclosure provides a split lens assembly and a camera module, where the spacer is wholly or partially a light blocking coating, thereby simplifying the mounting of the lenses in the lens module.

The present disclosure provides a split lens assembly and a camera module, where the lens module is fixed by means of the connecting medium, thereby ensuring stable packaging and effectively avoiding stray light.

The present disclosure provides a split lens assembly and a camera module, where the packaging of the connecting medium does not affect the spacing, and automatic calibration can be achieved while ensuring the optical stability, thereby reducing the production difficulty of the lens assembly and the camera module.

According to an aspect of the present disclosure, the present disclosure provides a split lens assembly, comprising at least two lens modules and a spacing provided between every two adjacent lens modules, each of the lens modules further comprising a lens set and a lens barrel, the lens barrel holding the lens set inside the lens barrel, the lens set comprising at least two lenses, and the spacing being provided between an edge of a lens near an image side of a lens set and an edge of a lens near an object side of another lens set.

According to an aspect of the present disclosure, the present disclosure provides a split lens assembly, comprising: a first lens module; and a second lens module, the first lens module being assembled to the second lens module, and a spacing for calibrating and assembling the first lens module and the second lens module located between the first lens module and the second lens module.

According to an embodiment of the present disclosure, the split lens assembly further comprises a connecting medium, and the first lens module is fixed to the second lens module by means of the connecting medium.

According to an embodiment of the present disclosure, the first lens module further comprises a first lens set and a first lens barrel, wherein the first lens set is supported by the first lens barrel, and the first lens barrel holds the first lens set inside the first lens barrel; and the second lens module further comprises a second lens barrel and a second lens set, wherein the second lens set is supported by the second lens barrel, and the second lens barrel holds the second lens set inside the second lens barrel.

According to an embodiment of the present disclosure, the first lens barrel is connected and fixed to the second lens barrel by means of the connecting medium.

According to an embodiment of the present disclosure, the spacing is located between an image side of the first lens set and an object side of the second lens set.

According to an embodiment of the present disclosure, the first lens set comprises at least two lenses, the second lens set comprises at least two lenses.

According to an embodiment of the present disclosure, image quality calibration is performed for the first lens set and the second lens set respectively, and then image quality calibration is performed for the first lens set and the second lens set.

According to an embodiment of the present disclosure, the connecting medium is a thermosetting material.

According to an embodiment of the present disclosure, the connecting medium is a photocuring material.

According to an embodiment of the present disclosure, the spacing is located between non-light-transmissive portions of an image side surface of a lens nearest to the image side in the first lens set and an object side surface of a lens nearest to the object side in the second lens set.

According to an embodiment of the present disclosure, the split lens assembly further comprises at least one spacer, and the spacer is disposed between the lenses, so that the lenses of the first lens set and the second lens set have an identical clear aperture.

According to an embodiment of the present disclosure, the spacing is located between non-light-transmissive portions of an image side surface of a spacer nearest to the image side in the first lens set and an object side surface of a lens nearest to the object side in the second lens set.

According to an embodiment of the present disclosure, the spacing is located between non-light-transmissive portions of an image side surface of a lens nearest to the image side in the first lens set and an object side surface of a spacer nearest to the object side in the second lens set.

According to an embodiment of the present disclosure, the spacer is a spacer ring.

According to an embodiment of the present disclosure, the spacer is a coating, the coating is a light-blocking material, and the coating is coated on an edge of at least one surface of the lens.

According to an embodiment of the present disclosure, a minimum height of the spacing ranges greater than or equal to 0.02 mm.

According to an embodiment of the present disclosure, a minimum height of the spacing ranges from 0.15 mm to 1 mm.

According to another aspect of the present disclosure, the present disclosure provides a camera module, formed by assembling the split lens assembly and a photosensitive device disposed corresponding to the split lens assembly and performing image quality calibration.

According to another aspect of the present disclosure, the present disclosure provides a split lens assembly, comprising:

at least two lens modules, each lens module comprising a lens set, a lens module being assembled to another lens module, and a spacing being located between non-light-transmissive portions of every two neighboring lens sets for facilitating the automatic calibration of the lens modules to compensate for image quality.

According to an embodiment of the present disclosure, a minimum height of the spacing ranges greater than or equal to 0.02 mm.

According to an embodiment of the present disclosure, a minimum height of the spacing ranges from 0.15 mm to 1 mm.

DETAILED DESCRIPTION OF EMBODIMENTS

The following description is used for disclosing the present disclosure to enable those skilled in the art to implement the present disclosure. In the following description, embodiments are provided by way of example only, and those skilled in the art may easily conceive of other variations. The basic principle of the present disclosure defined in the following description applies to other implementation solutions, variant solutions, improved solutions, equivalent solutions and other technical solutions that do not depart from the spirit and scope of the present disclosure.

It should be understood by those skilled in the art that in the disclosure of the present disclosure, the positions and positional relationships indicated by the terms such as "longitudinal", "transversal", "up", "down", "front", "rear", "left", "right", "vertical", "horizontal", "top", "bottom", "inside", "outside" are based on the positions or positional relationships shown in the accompany drawings, which are used only for convenient and brief description, and do not indicate or imply that the indicated apparatus or element must be in a specific position, and must be constructed and operated in a specific position. Therefore, the above-mentioned terms should not be considered as a limitation on the present disclosure.

It may be understood that the terms "a" and "an" should be construed as "at least one" or "one or more". That is, the term "a portion" means that the number of portions may be one in an embodiment, and may be plural in another embodiment.

Figure 1:
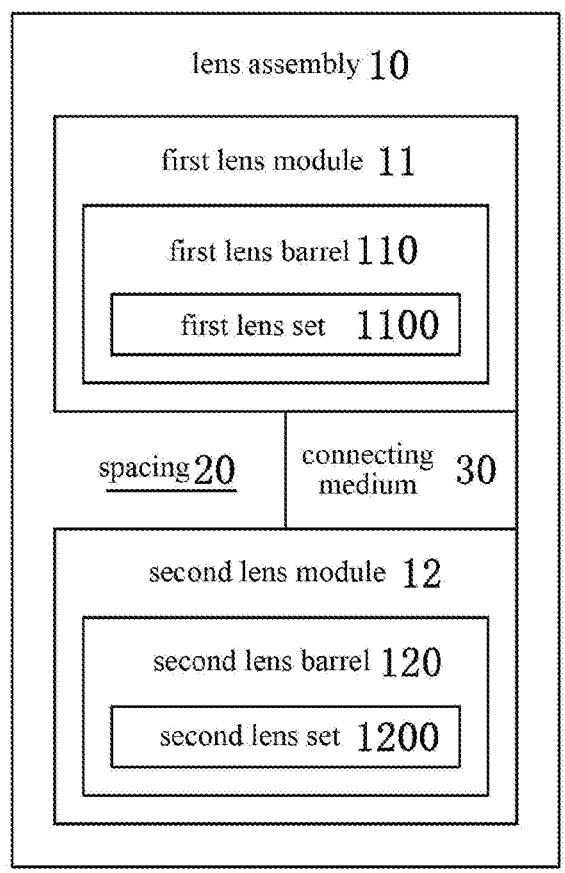
FIG. 1 is a schematic structural diagram of a split lens assembly according to an embodiment of the present disclosure.

The present disclosure provides a split lens assembly and a camera module. The split lens assembly and the camera module using the split lens assembly are assembled in a smart device for image capturing. The first embodiment of the present disclosure is illustrated with reference to FIG. 1 to FIG. 4. The split lens assembly 10 comprises a first lens module 11 and a second lens module 12. The first lens module 11 is assembled to the second lens module 12 by means of a connecting medium 30, so that the split lens assembly 10 has a split assembly structure, and is suitable for automatic calibration to compensate for the image quality, thereby achieving better performance. It should be noted that in order to illustrate and explain the structure of this embodiment, an image end of the first lens module 11 is assembled to an object end of the second lens module 12. Therefore, in the split lens assembly 10, the first lens module 11 is an object end lens module, and the second lens module 12 is an image end lens module. Further, an image end of the second lens module 12 is assembled to a camera module so that the split lens assembly 10 is assembled into a camera module. That is to say, in this embodiment, the split lens assembly 10 is formed by respectively assembling the first lens module 11 and the second lens module 12 as a lens module followed by packaging with the connecting medium 30. That is to say, the first lens module 11 is assembled and the image quality of the first lens module 11 is adjusted to ensure good image quality and structural integrity and firmness of the first lens module 11, and the second lens module 12 is assembled and the image quality of the second lens module 12 is adjusted to ensure good image quality and structural integrity and firmness of the second lens module 12. Then, the first lens module 11 and the second lens module 12 are assembled into the split lens assembly 10. Compared with a conventional lens assembly, the split lens assembly 10 can avoid the accumulated tolerance during assembly and also facilitate image quality calibration. Specifically, while ensuring the structural stability of the first lens module 11 and the second lens module 12, the performance of the split lens assembly 10 can be improved. During assembly of the first lens module 11 and the second lens module 12, the tolerance and image quality consistency are adjusted, thereby greatly reducing the production difficulty and effectively increasing the yield. The single component tolerance and assembly precision that need to be strictly controlled can be ensured. In addition, when the split lens assembly 10 is assembled into the camera module, the good image quality of the split lens assembly 10 also makes it easier to adjust the image quality, so that the split lens assembly 10 can be assembled into a camera module in different manners. For example, when the split lens assembly 10 needs to be performed image quality compensation with a photosensitive chip, the good image quality of the split lens assembly 10 makes it easier to perform the adjustment with the photosensitive chip, so that the deviation of the image quality compensation of the split lens assembly 10 and the photosensitive chip is easily controlled within a predetermined range. Whereby, the light performance and the production yield of the camera module using the split lens assembly 10 can be effectively improved. It should be noted that as shown in FIG. 1, after the first lens module 11 and the second lens module 12 are assembled, a certain spacing 20 is located between the first lens module 11 and the second lens module 12. It should be noted that the spacing 20 is not a spacing formed due to the shape of the lenses, but is located between edges of the lenses in the first lens module 11 and the second lens module 12, so that the edges of the lenses in the first lens module 11 are not in contact with and do not press against the edges of the lenses in the second lens module 12. That is to say, there is no structural contact between the lenses in the first lens module 11 and the lenses in the second lens module 12 in the split lens assembly 10, thereby ensuring that the structures of the lenses in the first lens module 11 and the lenses in the second lens module 12 are not affected. In addition, particular eccentric compensation is performed for the lenses in the lens modules during the assembly process, thereby ensuring the stable image quality of the first lens module 11 and the second lens module 12 after assembly.

Figure 2:
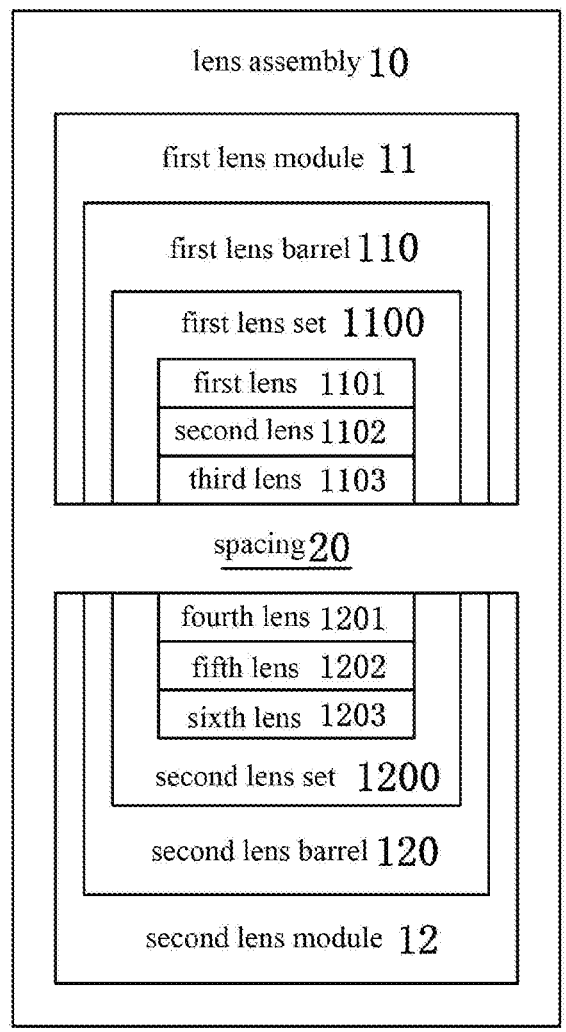
FIG. 2 is a schematic structural diagram of a lens module in the split lens assembly according to the above-mentioned embodiment of the present disclosure.

Because the first lens module 11 and the second lens module 12 in the split lens assembly 10 do not rely on the structural pressing and support of the lenses, which is different from conventional assembly methods, the split lens assembly 10 has more stable image quality. As shown in FIG. 2, in particular, the first lens module 11 comprises a first lens barrel 110 and a first lens set 1100, where the first lens set 1100 is supported by the first lens barrel 110, and the first lens barrel 110 holds the first lens set 1100 inside the first lens barrel 110. Similarly, the second lens module 12 comprises a second lens barrel 120 and a second lens set 1200, where the second lens set 1200 is supported by the second lens barrel 120, and the second lens barrel 120 holds the second lens set 1200 inside the second lens barrel 120. In order to explain and illustrate the first lens module 11 and the second lens module 12 in the split lens assembly 10, The first lens set 1100 of the first lens module 11 comprises three lenses, defined from the object side to the image side as a first lens 1101, a second lens 1102 and a third lens 1103, and the second lens set 1200 of the second lens module 12 comprises three lenses, defined from the object side to the image side as a fourth lens 1201, a fifth lens 1202 and a sixth lens 1203. Definitely, the number of lenses included in the first lens set 1100 and the number of lenses included in the second lens set 1200 are not limited to three. According to different optical designs and requirements, the number of lenses in the first lens set 1100 and the number of lenses in the second lens set 1200 may be changed correspondingly. Although the number of lenses in the first lens set 1100 and the number of lenses in the second lens set 1200 are not limited to the combination of 3+3, it is possible that this combination is an appropriate implementation. In addition, the lens assembly 10 further comprises at least one spacer 13, and the spacer 13 are disposed between the lenses, so that the lenses of the first lens set 1100 and the second lens set 1200 have an identical clear aperture. Optionally, the spacer 13 is a spacer ring 131, and the spacer ring 131 is disposed between two lenses, to ensure a certain aperture for light. Optionally, the spacer 13 is a coating 132, the coating 132 is a light-blocking material, and the coating 132 is coated on one or two surfaces of an edge of the lens. The spacer 13 blocks the unnecessary light-transmissive edge portion of the lens.

It should be noted that a lens nearest to the image side in the first lens module 11 and a lens nearest to the object side in the second lens module 12 are not in contact with each other, and do not press against each other through the spacer 13. Specifically, the spacing 20 is located between the edge of the third lens 1103 in the first lens set 1100 and the edge of the fourth lens 1201 in the second lens set 1200. The spacing 20 is a non-light-transmissive portion between the third lens 1103 and the fourth lens 1201, and is formed due to the reason that the first lens set 1100 and the second lens set 1200 are connected and assembled to each other by means of the first lens barrel 110 and the second lens barrel 120 because the first lens set 1100 is supported by the first lens barrel 110 and the second lens set 1200 is supported by the second lens barrel 120. In image quality calibration, the first lens set 1100 and the second lens set 1200 are adjusted by means of the spacing 20, to compensate for losses such as peaks, field curvature, and an image plane inclination caused by the assembly tolerance.

It should be noted that, the spacing 20 is located only between the third lens 1103 and the fourth lens 1201, and lenses in each lens set are in contact with and press against each other. That is, the first lens 1101 and the second lens 1102 are in contact with and press against each other, the second lens 1102 and the third lens 1103 are in contact with and press against each other, the fourth lens 1201 and the fifth lens 1202 are in contact with and press against each other, and the fifth lens 1202 and the sixth lens 1203 are in contact with and press against each other. Definitely, the first lens 1101 and the second lens 1102, the second lens 1102 and the third lens 1103, the fourth lens 1201 and the fifth lens 1202, and the fifth lens 1202 and the sixth lens 1203 may be in contact with and press against each other by means of the spacer 13.

Definitely, the spacing 20 between the third lens 1103 and the fourth lens 1201 has certain impact on the assembly of the entire split lens assembly 10 into the camera module. First, when the first lens set 1100 and the second lens set 1200 are respectively mounted in the first lens barrel 110 and the second lens barrel 120, the calibration of the first lens module 11 and the second lens module 12 has been completed in advance. That is to say, during the image quality calibration of the first lens set 1100 and the second lens set 1200, the spacing 20 makes the calibration of the image quality of the two lens sets easier. In addition, when assembled into the camera module, for example, when the photosensitive device is further calibrated, image quality compensation is performed for the first lens set 1100, the second lens set 1200 and the photosensitive device, and there is no accumulative error.

The first lens module 11 and the second lens module 12 in the split lens assembly 10 are connected to each other by means of the first lens barrel 110 and the second lens barrel 120, so that the first lens set 1100 and the second lens set 1200 can be assembled and image quality compensation can be performed. Specifically, the first lens barrel 110 comprises a first mounting portion 112, the second lens barrel 120 comprises a second mounting portion 122, and the first mounting portion 112 can be assembled to the second mounting portion 122, so as to assemble the first lens barrel 110 to the second lens barrel 120. The first lens module 11 and the second lens module 12 are respectively assembled as a lens module, then connected to each other by means of the first lens barrel 110 and the second lens barrel 120, and packaged with the connecting medium 30. Specifically, the connecting medium 30 comprises a mounting medium 32, and the mounting medium 32 is used for fixing the first mounting portion 112 of the first lens barrel 110 to the second mounting portion 122 of the second lens barrel 120. In addition, in this embodiment, the first lens barrel 110 further comprises a fixed portion 111, and the fixed portion 111 is fixed to a lens nearest to the image side in the first lens set 1100. That is to say, the third lens 1103 is fixed to the fixed portion 111 of the first lens barrel 110. Correspondingly, the connecting medium 30 further comprises a fixing medium 31, and the fixing medium 31 is used between the third lens 1103 and the fixed portion 111 of the first lens barrel 110 to fix the third lens 1103 to the fixed portion 111 of the first lens barrel 110. It should be understood by those skilled in the art that, the spacing 20 provides a space for the connecting medium 30. Specifically, for the fixing of the third lens 1103 by the fixing medium 31, and the fixing of the first lens barrel 110 and the second lens barrel 120 by the mounting medium 32, the spacing 20 can provide a space for the fixing medium 31 or the mounting medium 32. For example, the fixing medium 31 or the mounting medium 32 is a photocuring material. The function of the fixing medium 31 or the mounting medium 32 can be effectively exploited by means of the spacing 20. Definitely, in some feasible implementations, the mounting medium 32 may flow into the spacing 20 to fill the spacing to a certain extent, thereby ensuring the final firm state of the split lens assembly.

Figure 3:
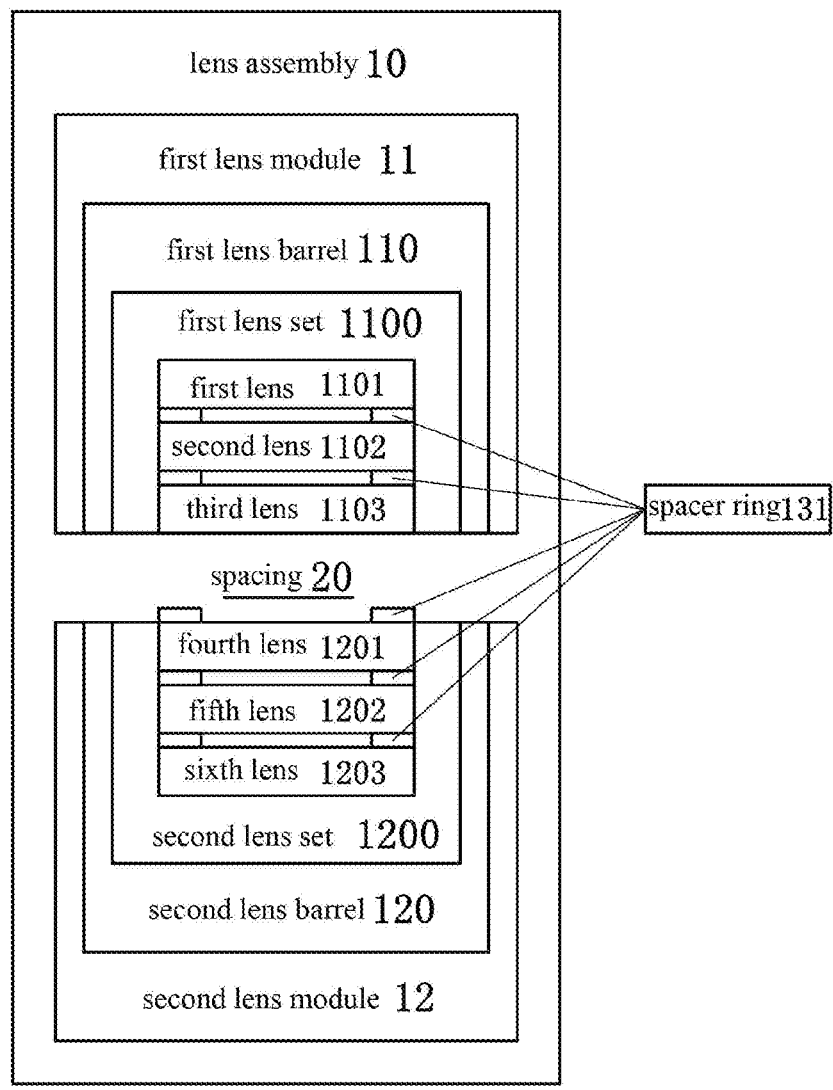
FIG. 3 is a schematic structural diagram of a lens module with a spacer ring in the split lens assembly according to the above-mentioned embodiment of the present disclosure.
Figure 4:
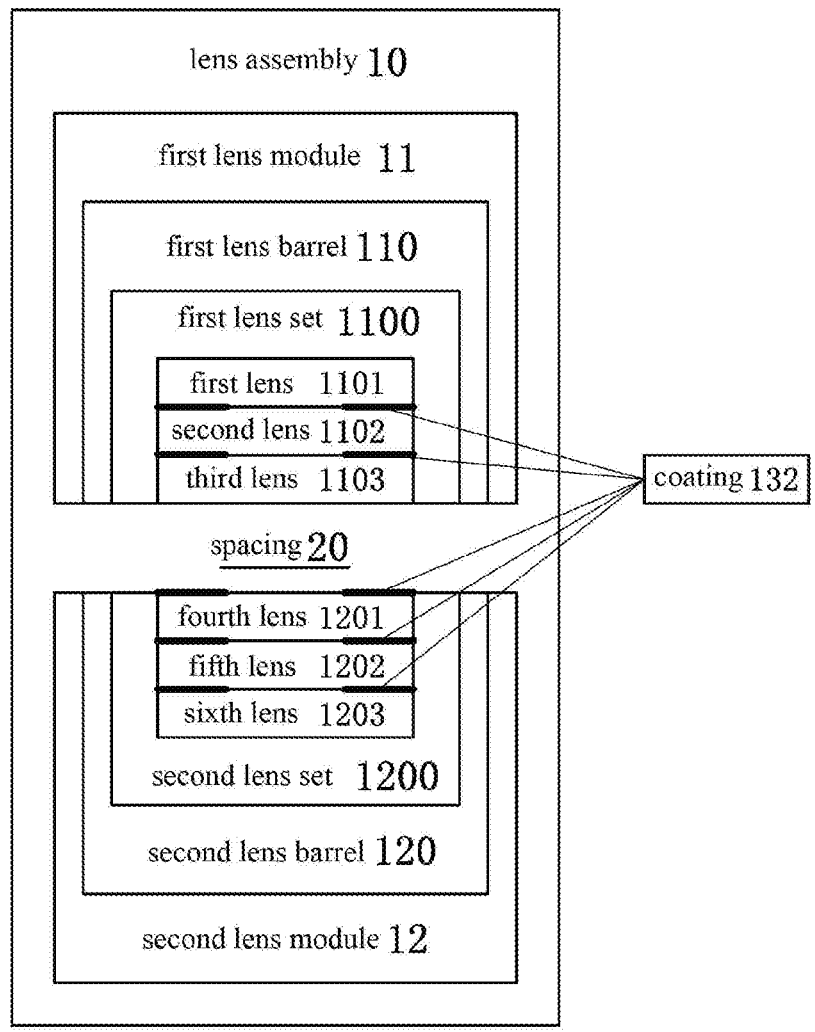
FIG. 4 is a schematic structural diagram of a lens module with a coating in the split lens assembly according to the above-mentioned embodiment of the present disclosure.

It should be noted that, the spacer 13 does not fill the spacing 20. FIG. 3 and FIG. 4 respectively illustrate a case where the spacer ring 131 is used and a case where the coating 132 is used. Because the first lens set 1100 and the second lens set 1200 are assembled to each other by means of the first lens barrel 110 and the second lens barrel 120, the spacing 20 between a lens nearest to the image side in the first lens set 1100 and a lens nearest to the object side in the second lens set 1200 will not be affected by the spacer 13. Specifically, as shown in FIG. 3, in the first lens set 1100, the first lens 1101 and the second lens 1102 are in contact with each other and the second lens 1102 and the third lens 1102 are in contact with each other by means of the spacer ring 131. Optionally, the first lens set 1100 is mounted to the first lens barrel 110 in an order of the first lens 1101, the spacer ring 131, the second lens 1102, the spacer ring 131, and the third lens 1103. In this way, the lenses and the spacer rings 131 press against each other, so that the lenses can be stably mounted. Similarly, the second lens set 1200 is mounted to the second lens barrel 120 in an order of the spacer ring 131, the fourth lens 1201, the spacer ring 131, the fifth lens 1202, the spacer ring 131, and the sixth lens 1203. Therefore, the first lens 1101 and the second lens 1102, the second lens 1102 and the third lens 1103, the fourth lens 1201 and the fifth lens 1202, and the fifth lens 1202 and the sixth lens 1203 are in contact with and fixed to each other by means of the spacer ring 131. Although the third lens 1103 and the fourth lens 1201 are separated by the spacer ring 131, the spacing 20 is located between the third lens 1103 and this spacer ring 131. For the case where the coating 132 is used, as shown in FIG. 4, the situation of the spacing 20 is similar. Although the third lens 1103 and the fourth lens 1201 are separated by the coating 132, the spacing 20 is located between the third lens 1103 and this coating 132. Optionally, the thickness of the coating 132 is negligible compared with the thickness of the lens, and therefore the height of the spacing 20 may be construed as the smallest distance between the edges of the third lens 1103 and the fourth lens 1201.

The spacing 20 may be of an uneven shape, and its width may change continuously or discontinuously, but the spacing 20 has a minimum height. The minimum height of the spacing 20 is defined here. The minimum height of the spacing 20 refers to the smallest height between non-light-transmissive portions of an image side surface of a lens or spacer nearest to the image side in the first lens set 1100 and an object side surface of a lens or spacer nearest to the object side in the second lens set 1200. That is to say, in this embodiment, when no spacer 13 is located between the third lens 1103 and the fourth lens 1201, the minimum height of the spacing 20 is the smallest distance between non-light-transmissive portions of the third lens 1103 and the fourth lens 1201. When a spacer 13 is disposed on the image side of the third lens 1103 and a spacer 13 is disposed on the object side of the fourth lens 1201, the minimum height of the spacing 20 is the smallest distance between non-light-transmissive portions of the image side surface of the spacer 13 on the image side of the third lens 1103 and the object side surface of the spacer 13 on the object side of the fourth lens 1201. When the spacer 13 is disposed on the image side of the third lens 1103 and no spacer 13 is disposed on the fourth lens 1201, the minimum height of the spacing 20 is the smallest distance between non-light-transmissive portions of the spacer 13 on the image side of the third lens 1103 and the object side surface of the fourth lens 1201. When no spacer 13 is disposed on the image side of the third lens 1103 and the spacer 13 is disposed on the object side of the fourth lens 1201, the minimum height of the spacing 20 is the smallest distance between non-light-transmissive portions of the image side surface of the third lens 1103 and the spacer 13 on the object side of the fourth lens 1201. The rest can be deduced by analogy, and will not be enumerated herein. The range of the minimum height of the spacing 20 should be selected properly. For example, the minimum height of the spacing 20 may range greater than or equal to 0.02 mm. For instance, the minimum height of the spacing 20 ranges from 0.15 mm to 1 mm (including 0.15 mm and 1 mm). Still further, the minimum height of the spacing 20 ranges from 0.15 mm to 0.7 mm (including 0.15 mm and 0.7 mm).

Figure 5:
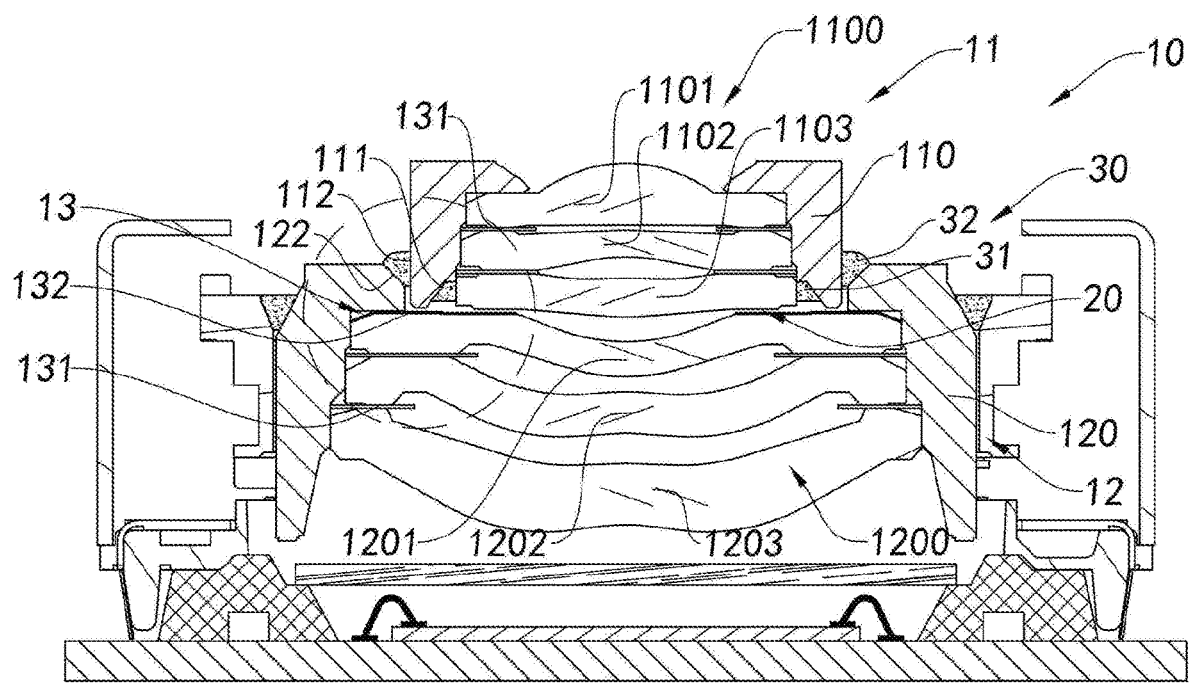
FIG. 5 is a schematic structural diagram of a lens module in a split lens assembly according to an embodiment of the present disclosure.
Figure 6:
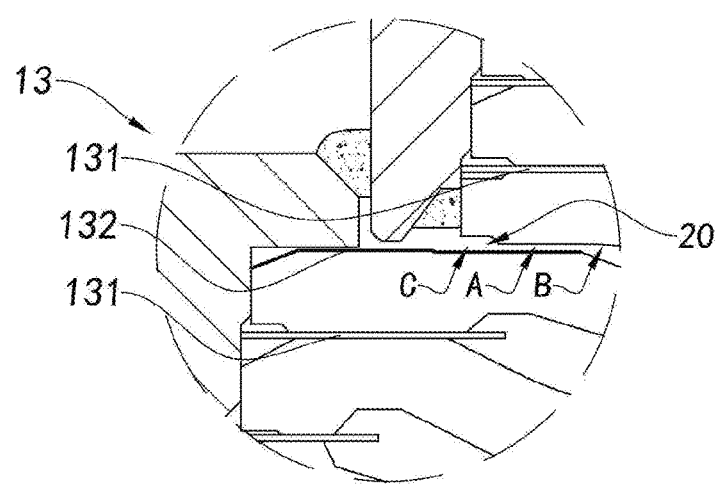
FIG. 6 is a detailed structural diagram of lens modules in the split lens assembly according to the above-mentioned embodiment of the present disclosure and a camera module.
Figure 7:
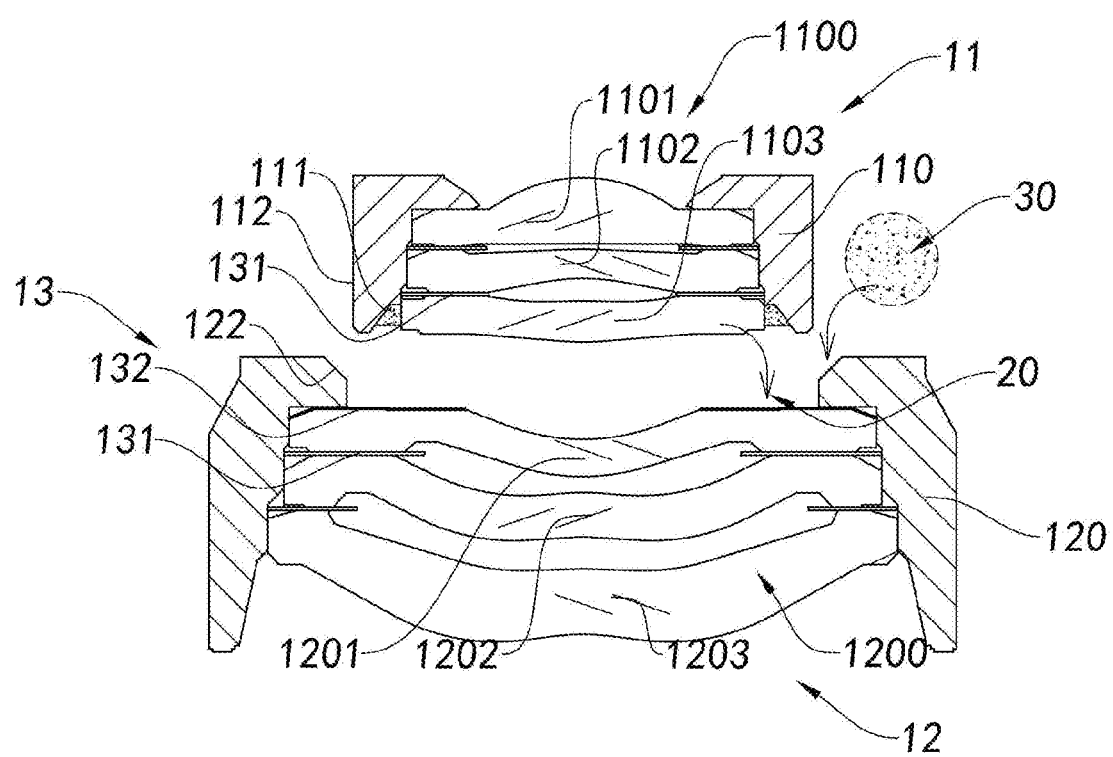
FIG. 7 is a schematic diagram of assembling of the split lens assembly according to the above-mentioned embodiment of the present disclosure and a camera module.

Another embodiment of the present disclosure is as shown in FIG. 5 to FIG. 7. In this embodiment, the split lens assembly 10 is assembled into a camera module. The split lens assembly 10 comprises a first lens module 11 and a second lens module 12. The first lens module 11 is assembled to the second lens module 12 by means of a connecting medium 30, so that the split lens assembly 10 has a split assembly structure, and is suitable for automatic calibration to compensate for the image quality, thereby achieving better performance. As shown in FIG. 6, after the first lens module 11 and the second lens module 12 are assembled, a certain spacing 20 is located between the first lens module 11 and the second lens module 12. Because the first lens module 11 and the second lens module 12 in the split lens assembly 10 do not rely on the structural pressing and support of the lenses, which is different from conventional assembly methods, the split lens assembly 10 has more stable image quality. It should be noted that the minimum height of the spacing 20 in this embodiment is the smallest distance between non-light-transmissive portions of the spacer 13 on the image side of the third lens 1103 and the object side surface of the fourth lens 1201, as indicated by position A in FIG. 6. Limited by the shape of the third lens 1103 and the fourth lens 1201, the spacing 20 formed due to the shape is located in the non-light-transmissive area. The spacing 20 has different heights at position A, position B and position C. The height at position A is the smallest height of the spacing 20, that is, the height at position A corresponds to the minimum height of the spacing 20. the height of the spacing 20 at position A ranges from 0.15 mm to 0.7 mm, preferably is 0.22 mm.

The first lens module 11 comprises a first lens barrel 110 and a first lens set 1100, where the first lens set 1100 is supported by the first lens barrel 110, and the first lens barrel 110 holds the first lens set 1100 inside the first lens barrel 110. Similarly, in order to explain and illustrate the first lens module 11 and the second lens module 12 in the split lens assembly 10, the first lens set 1100 of the first lens module 11 comprises three lenses, defined from the object side to the image side as a first lens 1101, a second lens 1102 and a third lens 1103, and the second lens set 1200 of the second lens module 12 comprises three lenses, defined from the object side to the image side as a fourth lens 1201, a fifth lens 1202 and a sixth lens 1203. The lens assembly 10 further comprises at least one spacer 13, the spacers 13 are disposed between the lenses, so that the lenses of the first lens set 1100 and the second lens set 1200 have an identical clear aperture.

In particular, the spacer ring 131 is located between the first lens 1101 and the second lens 1102, between the second lens 1102 and the third lens 1103, between the fourth lens 1201 and the fifth lens 1202, and between the fifth lens 1202 and the sixth lens 1203. The image side non-light-transmissive portion of the fourth lens 1201 is coated with the coating 132. In this way, flatness can be ensured when the fourth lens 1201 is mounted to the second lens barrel 120, thereby preventing an inclination. That is to say, the first lens 1101 and the second lens 1102, the second lens 1102 and the third lens 1103, the fourth lens 1201 and the fifth lens 1202, and the fifth lens 1202 and the sixth lens 1203 may be in contact with and press against each other by means of the spacer 13.

In addition, the connecting medium 30 further comprises a fixing medium 31, the fixing medium 31 is used for fixing the third lens 1103 to the first lens barrel 110. The connecting medium 30 comprises a mounting medium 32, and the mounting medium 32 is used for fixing the first lens barrel 110 to the second lens barrel 120.

It should be noted that in this embodiment, as shown in FIG. 7, the first lens barrel 110 further comprises a fixed portion 111, and the fixed portion 111 is fixed to a lens nearest to the image side in the first lens set 1100. That is to say, the third lens 1103 is fixed to the fixed portion 111 of the first lens barrel 110. For instance, the fixed portion 111 is located on an inner side of an image side barrel opening of the first lens barrel 110. After the third lens 1103 is mounted to the first lens barrel 110, the fixing medium 31 connects and fixes the third lens 1103 to the first lens barrel 110.

Optionally, the fixing medium 31 stably connects and fixes the third lens 1103 to the first lens barrel 110 after the image quality calibration of the first lens set 1100. The first lens barrel 110 comprises a first mounting portion 112, the second lens barrel 120 comprises a second mounting portion 122, and the first mounting portion 112 can be assembled to the second mounting portion 122, so as to assemble the first lens barrel 110 to the second lens barrel 120. In this embodiment, the first mounting portion 112 is located on an outer surface of the first lens barrel 110, and the second mounting portion 122 is located on the top end of the second lens barrel 120, so that the mounting medium 32 can be placed between the first mounting portion 112 and the second mounting portion 122. During the image quality calibration of the first lens set 1100 and the second lens set 1200, the spacing 20 can ensure the distance between the first lens set 1100 and the second lens set 1200, thereby avoiding a collision during the calibration process.

As shown in the assembly process of the split lens assembly 10 in FIG. 7, after the first lens set 1100 and the second lens set 1200 are respectively assembled and calibrated, the first lens set 1100 is assembled to the second lens set 1200. The first lens set 1100 is assembled to the image side of the second lens set 1200 by means of the spacing 20. After the first lens barrel 110 is placed at a position corresponding to the second lens barrel 120, the image quality calibration of the lenses can be completed by using an automatic calibration technology. After the calibration is completed, the first lens barrel 110 is connected and fixed to the second lens barrel 120 by means of the mounting medium 32. Thus, the calibration and assembly of the first lens module 11 and the second lens module 12 are completed. Definitely, with the structure of the first lens module 11 and the second lens module 12, one more lens module may be assembled to the first lens module 11 and the second lens module 12 according to design requirements. That is to say, the calibration and assembly of three lens modules are completed by means of two spacing 20. As can be deduced by analogy, assembling more lens modules is possible.

Figure 8:
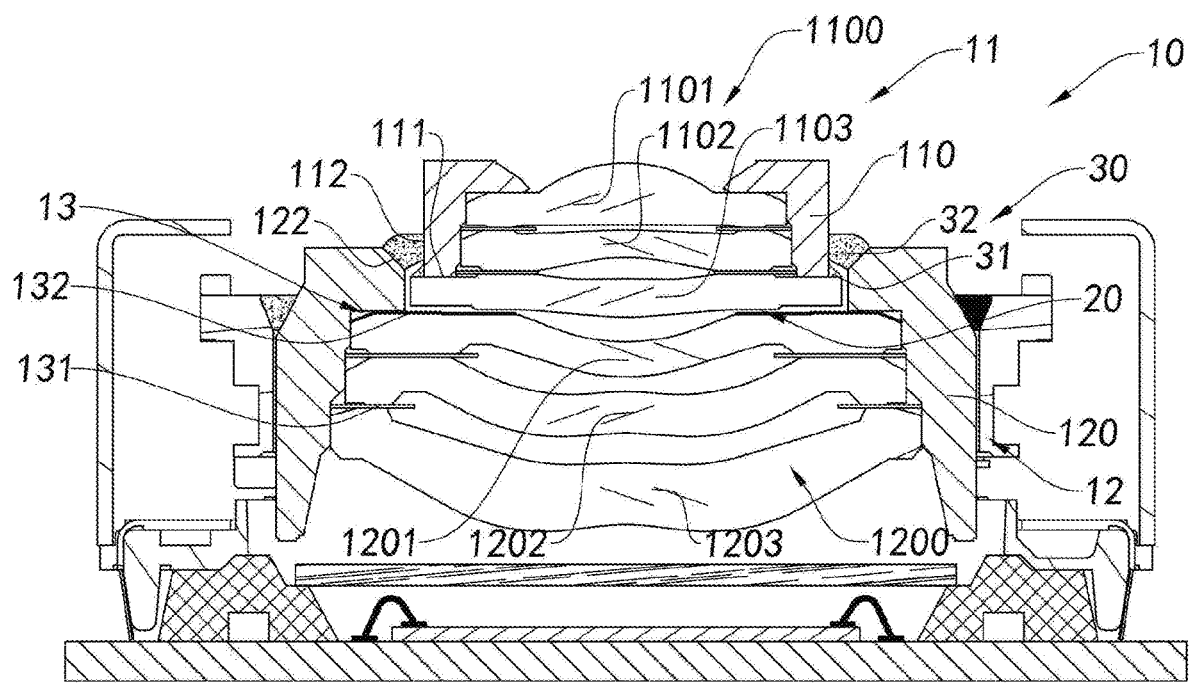
FIG. 8 is a schematic structural diagram of a lens module in a split lens assembly according to an embodiment of the present disclosure.
Figure 9:
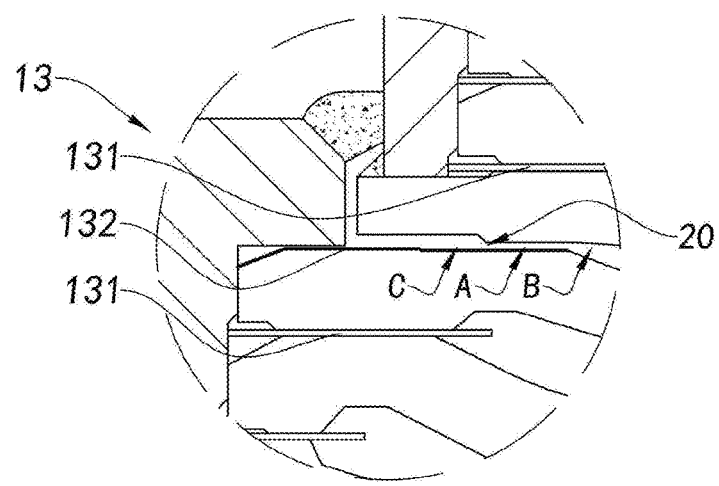
FIG. 9 is a detailed structural diagram of lens modules in the split lens assembly according to the above-mentioned embodiment of the present disclosure.

Another embodiment of the present disclosure is as shown in FIG. 8 and FIG. 9, where the split lens assembly 10 comprises a first lens module 11 and a second lens module 12. The structure of the first lens module 11 and the second lens module 12 is similar to that of the split lens assembly 10 in the above-mentioned embodiment, and will not be repeatedly described here.

Figure 10:
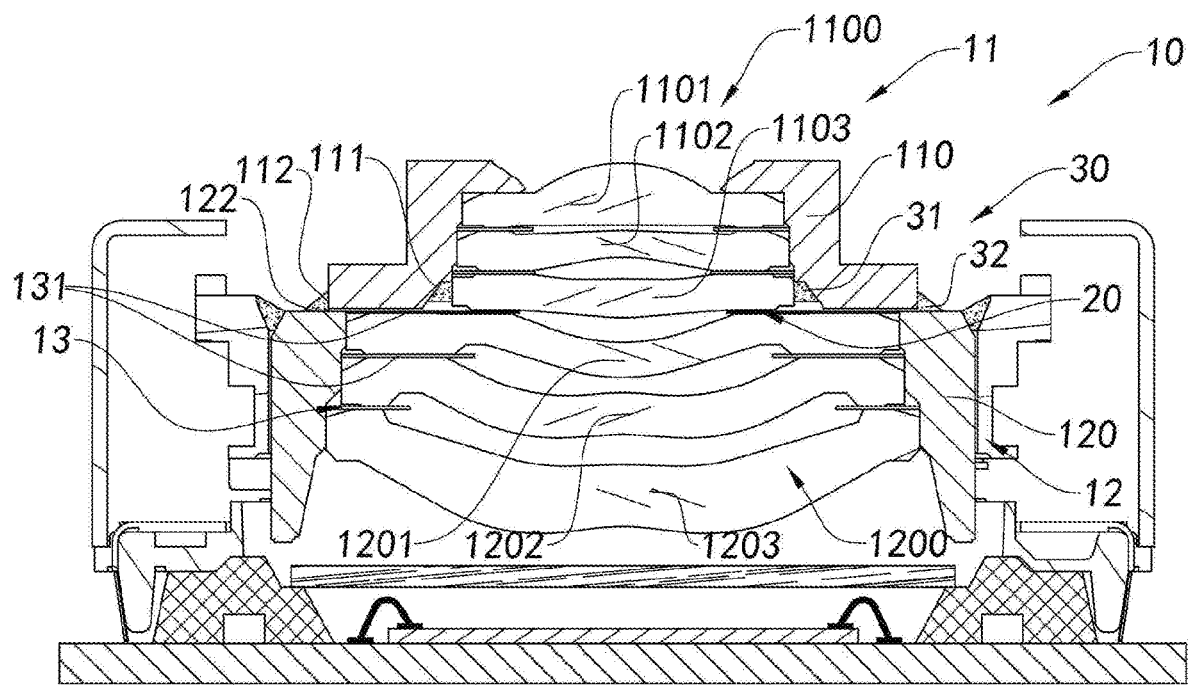
FIG. 10 is a schematic structural diagram of a lens module in a split lens assembly according to an embodiment of the present disclosure.
Figure 11:
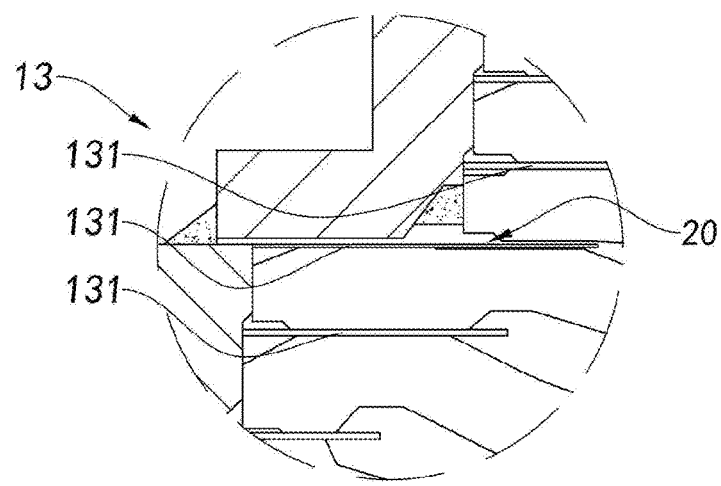
FIG. 11 is a detailed structural diagram of lens modules in the split lens assembly according to the above-mentioned embodiment of the present disclosure.

It should be noted that in this embodiment, as shown in FIG. 10, the first lens barrel 110 further comprises a fixed portion 111, and the fixed portion 111 is fixed to a lens nearest to the image side in the first lens set 1100. That is to say, the third lens 1103 is fixed to the fixed portion 111 of the first lens barrel 110. For instance, the fixed portion 111 is located on an outer side of an image side barrel opening of the first lens barrel 110. After the third lens 1103 is mounted to the first lens barrel 110, the fixing medium 31 connects and fixes the object side surface of the third lens 1103 to the first lens barrel 110. Optionally, the fixing medium 31 stably connects and fixes the third lens 1103 to the first lens barrel 110 after the image quality calibration of the first lens set 1100. The first lens barrel 110 comprises a first mounting portion 112, the second lens barrel 120 comprises a second mounting portion 122, and the first mounting portion 112 can be assembled to the second mounting portion 122, so as to assemble the first lens barrel 110 to the second lens barrel 120. In this embodiment, the first mounting portion 112 is located above the fixed portion 111 of the first lens barrel 110, and the second mounting portion 122 is located on the top end of the second lens barrel 120, so that the mounting medium 32 can be placed between the first mounting portion 112 and the second mounting portion 122. As shown in FIG. 11, during the image quality calibration of the first lens set 1100 and the second lens set 1200, the spacing 20 can ensure the distance between the first lens set 1100 and the second lens set 1200, thereby avoiding a collision during the calibration process. When the first lens set 1100 and the second lens set 1200 are respectively mounted in the first lens barrel 110 and the second lens barrel 120, the calibration of the first lens module 11 and the second lens module 12 has been completed in advance. That is to say, during the image quality calibration of the first lens set 1100 and the second lens set 1200, the spacing 20 makes the calibration of the image quality of the two lens sets easier. In addition, when assembled into the camera module, for example, when the photosensitive device is further calibrated, image quality compensation is performed for the first lens set 1100, the second lens set 1200 and the photosensitive device, and there is no accumulative error. It should be noted that the minimum height of the spacing 20 in this embodiment is the smallest distance between non-light-transmissive portions of the spacer 13 on the image side of the third lens 1103 and the object side surface of the fourth lens 1201, as indicated by position A in FIG. 9. Limited by the shape of the third lens 1103 and the fourth lens 1201, the spacing 20 formed due to the shape is located in the non-light-transmissive area. The spacing 20 has different heights at position A, position B and position C. The height at position A is the smallest height of the spacing 20, that is, the height at position A corresponds to the minimum height of the spacing 20. The height of the spacing 20 at position A ranges from 0.15 mm to 0.7 mm, preferably is 0.34 mm.

Another embodiment of the present disclosure is as shown in FIG. 10 and FIG. 11, where the split lens assembly 10 comprises a first lens module 11 and a second lens module 12. The structure of the first lens module 11 and the second lens module 12 is similar to that of the split lens assembly 10 in the above-mentioned embodiment, and will not be repeatedly described here.

It should be noted that in this embodiment, as shown in FIG. 10, the first lens barrel 110 further comprises a fixed portion 111, and the fixed portion 111 is fixed to a lens nearest to the image side in the first lens set 1100. That is to say, the third lens 1103 is fixed to the fixed portion 111 of the first lens barrel 110. For instance, the fixed portion 111 is located on an inner side of an image side barrel opening of the first lens barrel 110. After the third lens 1103 is mounted to the first lens barrel 110, the fixing medium 31 connects and fixes the object side surface of the third lens 1103 to the first lens barrel 110. Optionally, the fixing medium 31 stably connects and fixes the third lens 1103 to the first lens barrel 110 after the image quality calibration of the first lens set 1100. The first lens barrel 110 comprises a first mounting portion 112, the second lens assembly 120 comprises a second mounting portion 122, and the first mounting portion 112 can be assembled to the second mounting portion 122, so as to assemble the first lens barrel 110 to the second lens barrel 120. In this embodiment, the first mounting portion 112 is located on an outer edge of the first lens barrel 110, and the second mounting portion 122 is located on the top end of the second lens barrel 120, so that the mounting medium 32 can be placed between the first mounting portion 112 and the second mounting portion 122. As shown in FIG. 11, during the image quality calibration of the first lens set 1100 and the second lens set 1200, the spacing 20 can ensure the distance between the first lens set 1100 and the second lens set 1200, thereby avoiding a collision during the calibration process. When the first lens set 1100 and the second lens set 1200 are respectively mounted in the first lens barrel 110 and the second lens barrel 120, the calibration of the first lens module 11 and the second lens module 12 has been completed in advance. That is to say, during the image quality calibration of the first lens set 1100 and the second lens set 1200, the spacing 20 makes the calibration of the image quality of the two lens sets easier. In addition, when assembled into the camera module, for example, when the photosensitive device is further calibrated, image quality compensation is performed for the first lens set 1100, the second lens set 1200 and the photosensitive device, to compensate for losses such as peaks, field curvature, and an image plane inclination caused by the assembly tolerance, and there is no accumulative error.

Figure 12:
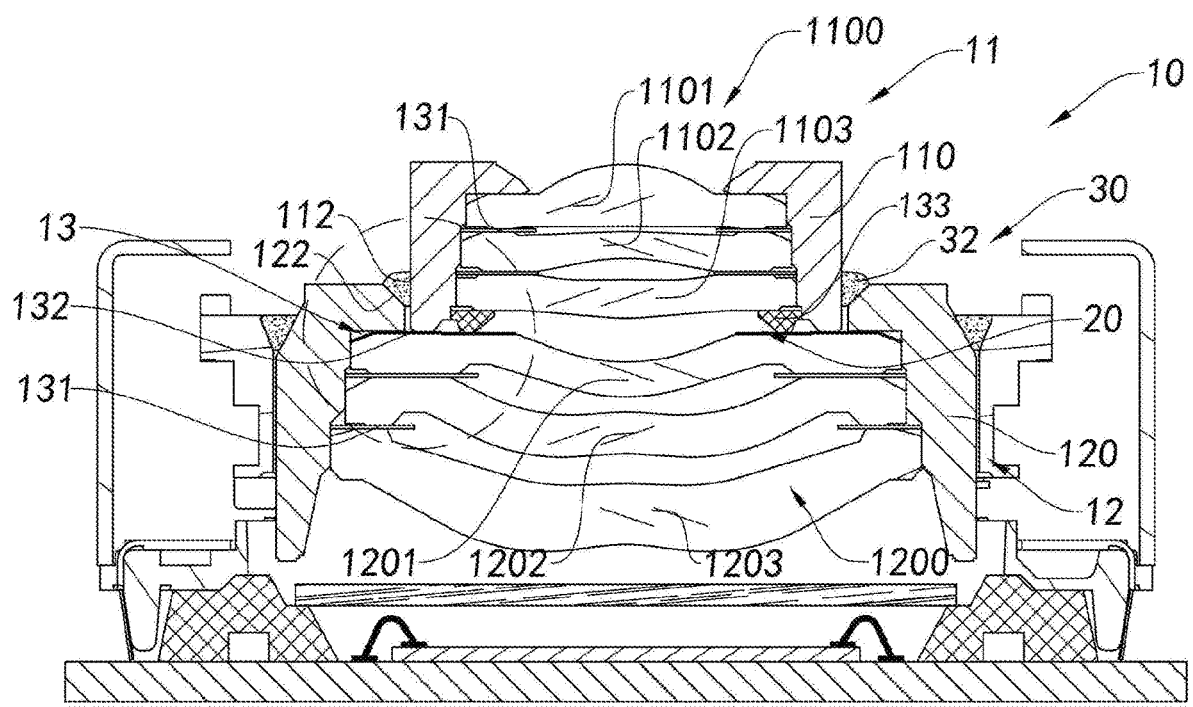
FIG. 12 is a schematic structural diagram of a lens module in a split lens assembly according to an embodiment of the present disclosure.
Figure 13:
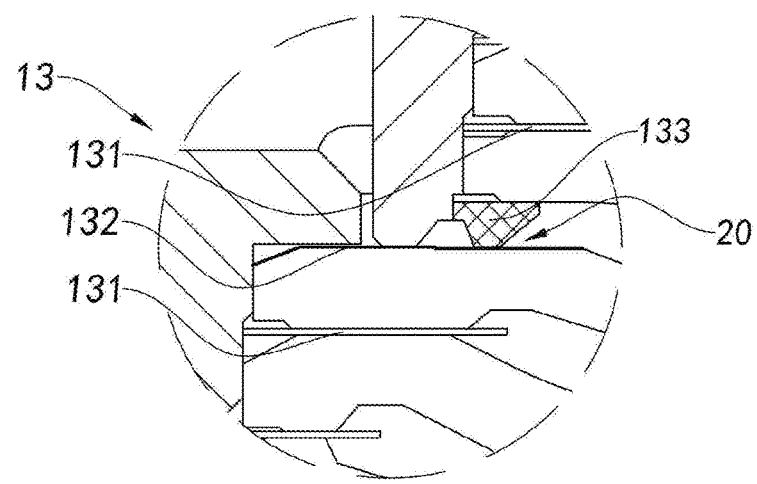
FIG. 13 is a detailed structural diagram of the lens modules in the split lens assembly according to the above-mentioned embodiment of the present disclosure.

Another embodiment of the present disclosure is as shown in FIG. 12 to FIG. 13. In this embodiment, the split lens assembly 10 is assembled into a camera module. The split lens assembly 10 comprises a first lens module 11 and a second lens module 12. The first lens module 11 is assembled to the second lens module 12 by means of a connecting medium 30, so that the split lens assembly 10 has a split assembly structure, and is suitable for automatic calibration to compensate for the image quality, thereby achieving better performance. As shown in FIG. 12, after the first lens module 11 and the second lens module 12 are assembled, a certain spacing 20 is located between the first lens module 11 and the second lens module 12. Because the first lens module 11 and the second lens module 12 in the split lens assembly 10 do not rely on the structural pressing and support of the lenses, which is different from conventional assembly methods, the split lens assembly 10 has more stable image quality.

The first lens module 11 comprises a first lens barrel 110 and a first lens set 1100, where the first lens set 1100 is supported by the first lens barrel 110, and the first lens barrel 110 holds the first lens set 1100 inside the first lens barrel 110. Similarly, the second lens module 12 comprises a second lens barrel 120 and a second lens set 1200, where the second lens set 1200 is supported by the second lens barrel 120, and the second lens barrel 120 holds the second lens set 1200 inside the second lens barrel 120. In order to explain and illustrate the first lens module 11 and the second lens module 12 in the split lens assembly 10, the first lens set 1100 of the first lens module 11 comprises three lenses, defined from the object side to the image side as a first lens 1101, a second lens 1102 and a third lens 1103, and the second lens set 1200 of the second lens module 12 comprises three lenses, defined from the object side to the image side as a fourth lens 1201, a fifth lens 1202 and a sixth lens 1203.

The lens assembly 10 further comprises at least one spacer 13, the spacers 13 are disposed between the lenses, so that the lenses of the first lens set 1100 and the second lens set 1200 have an identical clear aperture. It should be noted that a compression ring 133 is disposed on the image side of the third lens 1103. The compression ring 133 is adapted to fix the third lens 1103 inside the first lens barrel 110. The compression ring 133 can block stray light. It should be noted that the spacing 20 is the distance between the object side of the third lens 1103 and the image side of the fourth lens 1201. It should be also noted that the height of the compression ring 133 should be less than the minimum height of the spacing 20, such that the third lens 1103 and the fourth lens 1201 would not press against each other by the compression ring 133. In this embodiment, the minimum height of the spacing 20 is preferably 0.34 mm.

In particular, the spacer ring 131 is located between the first lens 1101 and the second lens 1102, between the second lens 1102 and the third lens 1103, between the fourth lens 1201 and the fifth lens 1202, and between the fifth lens 1202 and the sixth lens 1203. The spacer ring 131 is also disposed on the image side of the fourth lens 1201. That is to say, the first lens 1101 and the second lens 1102, the second lens 1102 and the third lens 1103, the fourth lens 1201 and the fifth lens 1202, and the fifth lens 1202 and the sixth lens 1203 may be in contact with and press against each other by means of the spacer 13.

In addition, the connecting medium 30 further comprises a fixing medium, the fixing medium is used for the third lens 1103 and the compression ring 133 to fix the third lens 1103 to the first lens barrel 110. The connecting medium 30 comprises a mounting medium 32, and the mounting medium 32 is used for fixing the first lens barrel 110 and the second lens barrel 120, to ensure the final firm state of the lens assembly or the camera module.

As shown in FIG. 13, during the image quality calibration of the first lens set 1100 and the second lens set 1200, the spacing 20 can ensure the distance between the first lens set 1100 and the second lens set 1200, thereby avoiding a collision during the calibration process. When the first lens set 1100 and the second lens set 1200 are respectively mounted in the first lens barrel 110 and the second lens barrel 120, the calibration of the first lens module 11 and the second lens module 12 has been completed in advance. That is to say, during the image quality calibration of the first lens set 1100 and the second lens set 1200, the spacing 20 makes the calibration of the image quality of the two lens sets easier. In addition, when assembled into the camera module, for example, when the photosensitive device is further calibrated, image quality compensation is performed for the first lens set 1100, the second lens set 1200 and the photosensitive device, to compensate for losses such as peaks, field curvature, and an image plane inclination caused by the assembly tolerance, and there is no accumulative error.

It should be understood by those skilled in the art that the embodiments of the present disclosure shown in the above-mentioned descriptions and the accompanying drawings are provided by way of example only and are not intended to limit the present disclosure. The objective of the present disclosure has been fully and effectively achieved. The functions and structural principles of the present disclosure have been demonstrated and illustrated in the embodiments. Various variations or modifications can be made to the detailed description of the present disclosure without departing from said principles.

What is claimed is:

1. A split lens assembly, comprising at least two lens modules and a spacing provided between every two adjacent lens modules, each of the lens modules further comprising a lens set and a lens barrel, the lens barrel holding the lens set inside the lens barrel, the lens set comprising at least two lenses, wherein the spacing defines a space extending from non-light-transmissive portion of an image side surface of a lens nearest to an image side in a first lens set to non-light-transmissive portion of an object side surface of a lens nearest to an object side in a second lens set so that the lens nearest to the image side in the first lens set is not in contact with and does not press against the lens nearest to the object side in the second lens set, wherein the split lens assembly further comprises a connecting medium, and a first lens barrel and a second lens barrel respectively comprised in every two adjacent lens modules are separated by the spacing and are connected to each other by means of the connecting medium, wherein the connecting medium comprises a mounting medium, the mounting medium is placed between a first mounting portion located on an outer surface of the first lens barrel that accommodates the first lens set and a second mounting portion located on a top end of the second lens barrel that accommodates the second lens set, so that the mounting medium flows into the spacing to fill the spacing to a certain extent during mounting the split lens assembly to connect and fix the first and second lens barrels of the two adjacent lens modules separated by the spacing to each other by means of the mounting medium, to ensure a final firm state of the split lens assembly.

2. The split lens assembly according to claim 1, wherein the connecting medium is a thermosetting material or a photocuring material.

3. The split lens assembly according to claim 1, wherein a minimum height of the spacing ranges greater than or equal to 0.02 mm.

4. The split lens assembly according to claim 3, wherein the minimum height of the spacing ranges from 0.15 mm to 1 mm.

5. The split lens assembly according to claim 1, wherein adjacent lenses in each lens set press against each other by means of a spacer, and the spacer is a spacer ring.

6. The split lens assembly according to claim 1, wherein adjacent lenses in each lens set press against each other by means of a spacer, and the spacer is a coating, the coating being a light-blocking material and being coated on an edge of at least one surface of at least one lens.

7. A camera module, comprising:
a split lens assembly, comprising at least two lens modules and a spacing provided between every two adjacent lens modules, each of the lens modules further comprising a lens set and a lens barrel, the lens barrel holding the lens set inside the lens barrel, the lens set comprising at least two lenses, wherein the spacing defines a space extending from non-light-transmissive portion of an image side surface of a lens nearest to an image side in a first lens set to non-light-transmissive portion of an object side surface of a lens nearest to an object side in a second lens set so that the lens nearest to the image side in the first lens set is not in contact with and does not press against the lens nearest to the object side in the second lens set; and
a photosensitive device disposed corresponding to the split lens assembly, wherein the camera module is formed by assembling the split lens assembly and the photosensitive device based on image quality calibration, wherein the split lens assembly further comprises a connecting medium, and a first lens barrel and a second lens barrel respectively comprised in every two adjacent lens modules are separated by the spacing and are connected to each other by means of the connecting medium, wherein the connecting medium comprises a mounting medium, the mounting medium is placed between a first mounting portion located on an outer surface of the first lens barrel that accommodates the first lens set and a second mounting portion located on a top end of the second lens barrel that accommodates the second lens set, so that the mounting medium flows into the spacing to fill the spacing to a certain extent during mounting the split lens assembly to connect and fix the first and second lens barrels of the two adjacent lens modules separated by the spacing to each other by means of the mounting medium, to ensure a final firm state of the split lens assembly.

8. A split lens assembly, comprising:
a first lens module, wherein the first lens module comprises a first lens set and a first lens barrel, the first lens barrel holds the first lens set inside the first lens barrel; and
a second lens module, wherein the second lens module comprises a second lens set and a second lens barrel, the second lens barrel holds the second lens set inside the second lens barrel, wherein the first lens module is separated from the second lens module by a spacing and being assembled to the second lens module by means of a connecting medium, wherein the spacing is for calibrating and assembling the first lens module and the second lens module and the spacing is located between an image side of the first lens module and an object side of the second lens module, wherein the spacing defines a space extending from non-light-transmissive portion of an image side surface of a lens nearest to the image side in the first lens module to non-light-transmissive portion of the object side surface of a lens nearest to an object side in the second lens module so that the lens nearest to the image side in the first lens module is not in contact with and does not press against the lens nearest to the object side in the second lens module, wherein the first lens barrel comprised in the first lens module and the second lens barrel comprised in the second lens module are separated by the spacing, wherein the connecting medium comprises a mounting medium, the mounting medium is placed between a first mounting portion located on an outer surface of the first lens barrel and a second mounting portion located on a top end of the second lens barrel, so that the mounting medium flows into the spacing to fill the spacing to a certain extent during mounting the split lens assembly to connect and fix the first lens barrel in the first lens module to the second lens barrel in the second lens module by means of the mounting medium, to ensure a final firm state of the split lens assembly.

9. The split lens assembly according to claim 8, wherein a minimum height of the spacing ranges greater than or equal to 0.02 mm.

10. The split lens assembly according to claim 8, wherein a minimum height of the spacing ranges from 0.15 mm to 1 mm.

11. The split lens assembly according to claim 8, wherein the connecting medium is a thermosetting material or a photocuring material.

12. The split lens assembly according to claim 8, wherein the split lens assembly further comprises at least one spacer, and wherein the spacer is disposed between lenses in the first lens module or the second lens module, so that the lenses of the first lens module and the second lens module have an identical aperture.

13. The split lens assembly according to claim 12, wherein the spacer is a spacer ring or a light-blocking coating.

14. The split lens assembly according to claim 1, wherein a compression ring is disposed on the image side surface of the lens nearest to the image side in the first lens set, the compression ring is adapted to fix the lens nearest to the image side in the first lens set inside a first lens barrel, the first lens barrel being for accommodating the first lens set, and the compression ring blocks stray light.

15. The split lens assembly according to claim 1, wherein the split lens assembly further comprises a fixing medium, the fixing medium connects and fixes, after image quality calibration of the first lens set, the lens nearest to the image side in the first lens set to a first lens barrel that is for accommodating the first lens set.

* * * * *